United States Patent
Sugino

(10) Patent No.: US 10,790,653 B2
(45) Date of Patent: Sep. 29, 2020

(54) WIRE HARNESS

(71) Applicant: SUMITOMO WIRING SYSTEMS, LTD., Yokkaichi, Mie (JP)

(72) Inventor: Hidetoshi Sugino, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/034,935

(22) Filed: Jul. 13, 2018

(65) Prior Publication Data

US 2019/0089142 A1    Mar. 21, 2019

(30) Foreign Application Priority Data

Sep. 15, 2017  (JP) ................................ 2017-177235

(51) Int. Cl.
| | | |
|---|---|---|
| *H02G 3/04* | (2006.01) | |
| *H02G 3/34* | (2006.01) | |
| *B60R 16/02* | (2006.01) | |

(52) U.S. Cl.
CPC ............ *H02G 3/34* (2013.01); *B60R 16/0215* (2013.01); *H02G 3/0487* (2013.01)

(58) Field of Classification Search
CPC .......... H02G 3/34; H02G 3/0487; H02G 3/00; H02G 3/02; H02G 3/30; B60R 16/0215; B60R 16/0207; B60R 16/00; H01B 13/00; H01B 13/01209; H01B 7/0045; H01B 7/00; H01B 7/18
USPC .......... 174/68.1, 68.3, 72 A, 70 C, 95, 70 R, 174/40 CC, 91, 72 C; 248/68.1, 49
See application file for complete search history.

(56) References Cited

U.S. PATENT DOCUMENTS

| | | | | |
|---|---|---|---|---|
| 6,878,879 B2* | 4/2005 | Takahashi | ............ | H02G 3/0418 174/68.3 |
| 7,017,615 B2* | 3/2006 | Suzuki | ................ | B60R 16/0215 174/68.3 |
| 7,038,133 B2* | 5/2006 | Arai | ...................... | H02G 3/0418 174/72 A |
| 7,214,879 B1* | 5/2007 | Suzuki | ................ | B60R 16/0215 174/68.3 |
| 7,709,736 B2* | 5/2010 | Irisawa | ............... | B60R 16/0215 174/135 |
| 7,964,796 B2* | 6/2011 | Suzuki | ................ | B60R 16/0215 174/72 A |

(Continued)

FOREIGN PATENT DOCUMENTS

| | | |
|---|---|---|
| CN | 103718401 A | 4/2014 |
| CN | 204144841 U | 2/2015 |

(Continued)

OTHER PUBLICATIONS

Nov. 20, 2019 Office Action issued in Chinese Patent Application No. 201811056417.4.

*Primary Examiner* — Angel R Estrada
(74) *Attorney, Agent, or Firm* — Oliff PLC

(57) ABSTRACT

Provided is a wire harness that can realize a simplified mold structure and reduce costs. A wire harness includes: a tubular member that is flexible and into which an electrical wire is inserted; and a path regulation member that regulates a routing path of the electrical wire. The path regulation member includes bent portions. The bent portions are formed by bending the path regulation members, and thus the routing path of the electrical wire can be regulated.

12 Claims, 14 Drawing Sheets

(56) References Cited

U.S. PATENT DOCUMENTS

| | | | |
|---|---|---|---|
| 9,672,959 B2 * | 6/2017 | Sakaki | B60R 16/0207 |
| 9,701,263 B2 * | 7/2017 | Hagi | B60R 16/0215 |
| 10,135,229 B2 * | 11/2018 | Matsumura | H02G 3/0418 |
| 2013/0206447 A1 | 8/2013 | Iio | |

FOREIGN PATENT DOCUMENTS

| | | |
|---|---|---|
| JP | 2012-90503 A | 5/2012 |
| JP | 2013-27169 A | 2/2013 |

* cited by examiner

WIRE HARNESS

TECHNICAL FIELD

The present disclosure relates to a wire harness.

BACKGROUND ART

In a wire harness that is routed in an automobile, an electrical wire is inserted into a tubular member such as a corrugated tube, and is protected such that the electrical wire is prevented from coming into contact with other parts and being damaged (see JP 2012-90503A, for example). Also, in some cases, a wire harness is provided with a protector, instead of a tubular member. A protector is a molded resin product, and includes a trough-shaped main body whose upper, front, and rear surfaces are open, and a lid that closes the upper opening. The front and rear openings are used as the entrance and exit of the electrical wire, and an insertion path for the electrical wire is provided inside.

JP2012-90503A is an example of related art.

SUMMARY

In the above-described cases, if the routing path is changed, it is necessary to remanufacture a mold for molding the protector. Such remanufacturing increases costs, and requires a significant amount of time.

The present disclosure has been completed in view of the above-described situation, and aims to provide a wire harness that is easily adaptable to a design change.

A wire harness according to the present disclosure includes: a tubular member that is flexible and into which an electrical wire is inserted; and a path regulation member that regulates a routing path of the electrical wire. The path regulation member includes a bent portion.

With the above-described configuration, it is possible to regulate the routing path of the electrical wire by forming a bent portion by bending the path regulation members. Thus, it is easier to adapt to a design change.

EMBODIMENTS

Figure 1:
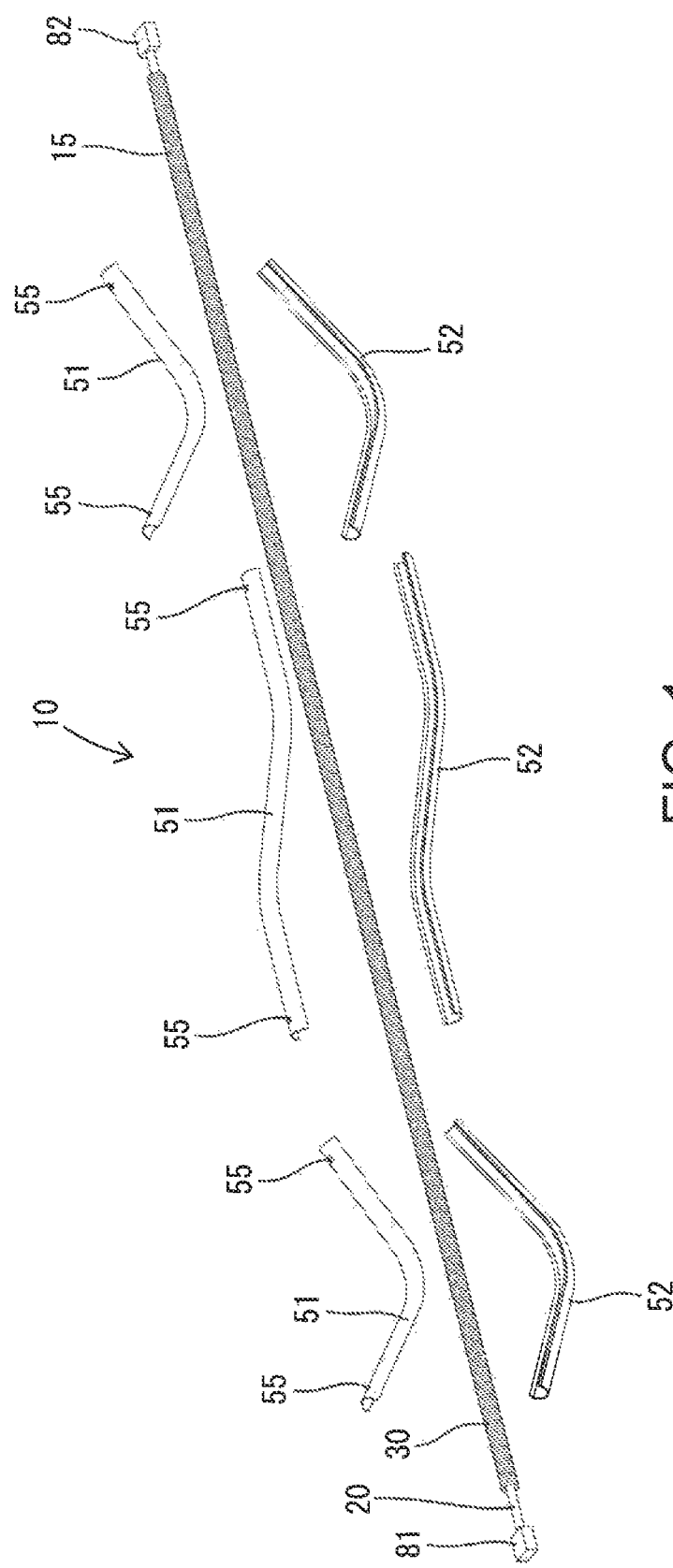
FIG. 1 is a partially-exploded perspective view of a wire harness according to a first embodiment.

The following describes preferable embodiments.

It is preferable that the path regulation member is a metal tube or a complex tube that is made of metal and resin. With this configuration, it is possible to simplify the structure of the path regulation member compared to a conventional protector that is made of resin. Also, it is easier to perform a bending process on the path regulation member, and it is possible to achieve rigidity that is sufficient to retain the shape of the bent portion. Note that the metal tube and the complex tube are concepts that include a tubular member that has a C-shaped cross section with a portion in the circumferential direction that is open.

The path regulation member may be provided in a plurality at intervals in a lengthwise direction of the wire harness. If the wire harness includes a plurality of bent sections, a plurality of bent portions respectively corresponding to the bent sections are required. However, in this case, if the wire harness is configured such that only one path regulation member is provided for all of the plurality of bent portions, there is a concern that the weight of the wire harness significantly increases. In this regard, with the above-described configuration, the path regulation member can be omitted from sections other than the bent sections of the wire harness, and thus it is possible to suppress an increase in the weight of the wire harness. In this case, if the path regulation members is a pipe (which may be a tubular member that has a C-shaped cross section), it is possible to easily manufacture a plurality of divided path regulation members by cutting an elongated pipe base material into pieces.

Preferably, the path regulation member includes a pair of half-split pipes that are combined together with the electrical wire being sandwiched therebetween. If the path regulation member is constituted by an integrated pipe, it is necessary to perform work to pass the electrical wire from one end of the path regulation member to the other end, and there is the problem of a heavy workload. In contrast, with the above-described configuration, it is possible to form the path regulation member by combining one of the half-split pipes with the other of the half-split pipes after passing the electrical wire and the tubular member along the inner surface of one of the half-split pipes. Thus, workability is excellent. In particular, it is possible to combine the pair of half-split pipes at the final stage of assembly after inserting the electrical wire into the tubular member and connecting connectors or the like to the ends of the wire harness.

Preferably, a direction in which half-split surfaces of the pair of half-split pipes face each other and a direction in which the bent portion is bent are the same or orthogonal to each other. With the above-described configuration, when the pair of half-split pipes are combined together and are subjected to a bending process so that the bent portion is formed, it is possible to prevent a distorting force from being applied to the half-split surfaces of the half-split pipes in a twisting direction. Thus, it is possible to improve processing accuracy. Note that the above-described same direction and orthogonal direction are not limited to the same direction and orthogonal direction in the strict sense, and are concepts that include a substantially same direction and substantially orthogonal direction that differ from the same direction and orthogonal direction in the strict sense, to the extent that a distorting force is not applied to the half-split surfaces of the half-split pipes in a twisting direction.

Preferably, the wire harness includes a coupling member that holds the pair of half-split pipes in a combined state, and the coupling member is provided with a pipe engagement portion that restricts the pair of half-split pipes from moving in an axial direction. With this configuration, using the coupling member, it is possible to hold the pair of half-split pipes so as to be restricted from being separated from each other in the radial direction and the lengthwise direction.

Preferably, the tubular member is a corrugated tube, and the coupling member is provided with a tubular member engagement portion that is fitted to a recess and a protrusion of the corrugated tube in a radial direction. With this configuration, the coupling member can have both the function of holding the half-split pipes and the function of restricting the tubular member and the path regulation member from being displaced from each other in the lengthwise direction. Thus, it is possible to simplify the configuration compared to when these functions are provided by separate members. Also, since it is possible to use the existing recesses and protrusions of a corrugated tube, it is unnecessary to make a design change to the corrugated tube.

Preferably, in a cross section of the bent portion along a direction that is orthogonal to a lengthwise direction of the wire harness, the tubular member is located inside the path regulation member, and the electrical wire is located inside the tubular member. With this configuration, the tubular member and the path regulation member are located around the outer circumferential surface of the electrical wire in the bent portion. Thus, it is possible to more reliably protect the electrical wire.

Preferably, in a cross section of the bent portion along a direction that is orthogonal to a lengthwise direction of the wire harness, the electrical wire is located inside the path regulation member, and the tubular member is not interposed between the electrical wire and the path regulation member. With this configuration, since the tubular member is not present, it is possible to suppress an increase in the diameter of the bent portion.

First Embodiment

Figure 10:
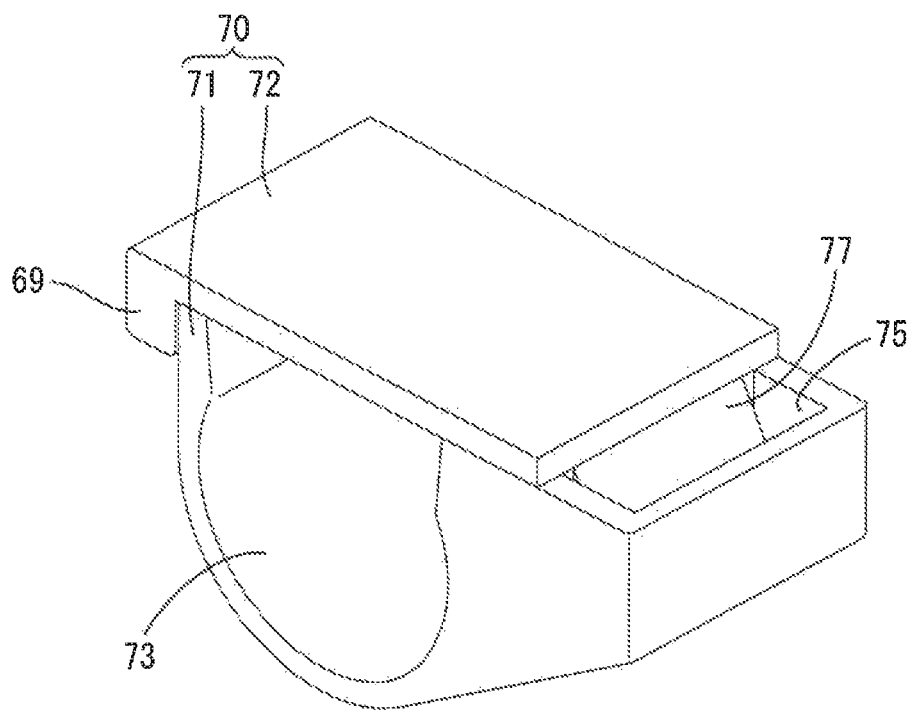
FIG. 10 is a perspective view of a clamp.
Figure 11:
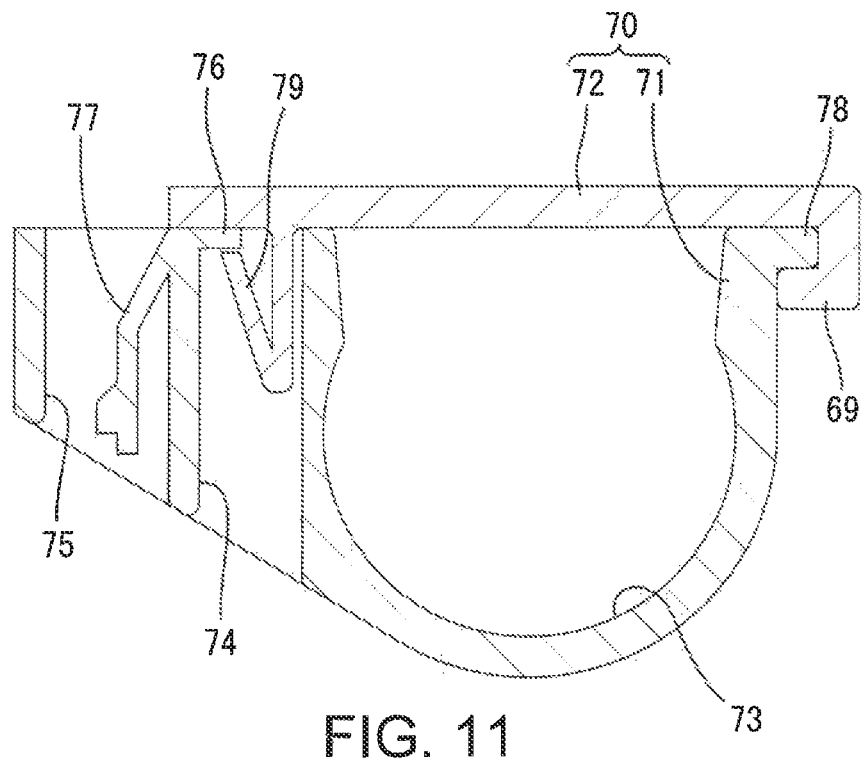
FIG. 11 is a cross-sectional view of the clamp.
Figure 12:
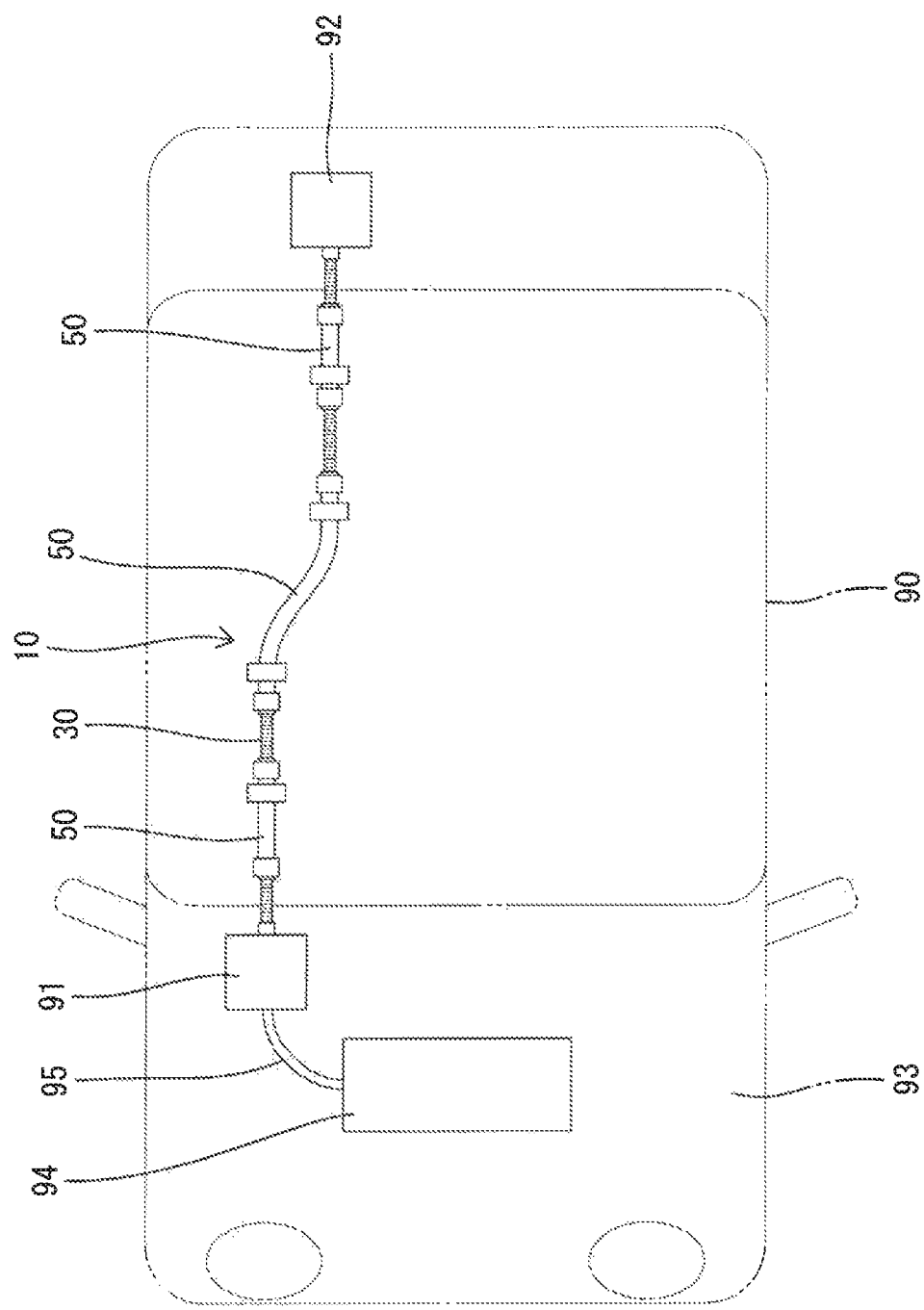
FIG. 12 is a schematic diagram of a routing structure for routing the wire harness in an automobile.

The following describes a first embodiment with reference to FIGS. 1 to 12. As shown in FIG. 12, a wire harness 10 according to a first embodiment is an example of a harness that is routed along a floor portion of an automobile 90, from a front portion to a rear portion of the automobile body. The wire harness 10 is connected to a junction box 91 via a connector 81 (see FIG. 2) in a front portion of the automobile body, and is connected to an electrical component 92 via a connector 82 (see FIG. 2) in a rear portion of the automobile body. The junction box 91 is connected to an engine 94 in an engine room 93 via a power supply electrical wire 95, and power is supplied from the junction box 91 to the electrical component 92 on the load side via the wire harness 10. In the following description, a front-rear direction refers to the front-rear direction of the automobile body, and is equivalent to the lengthwise direction of the wire harness 10.

Figure 2:
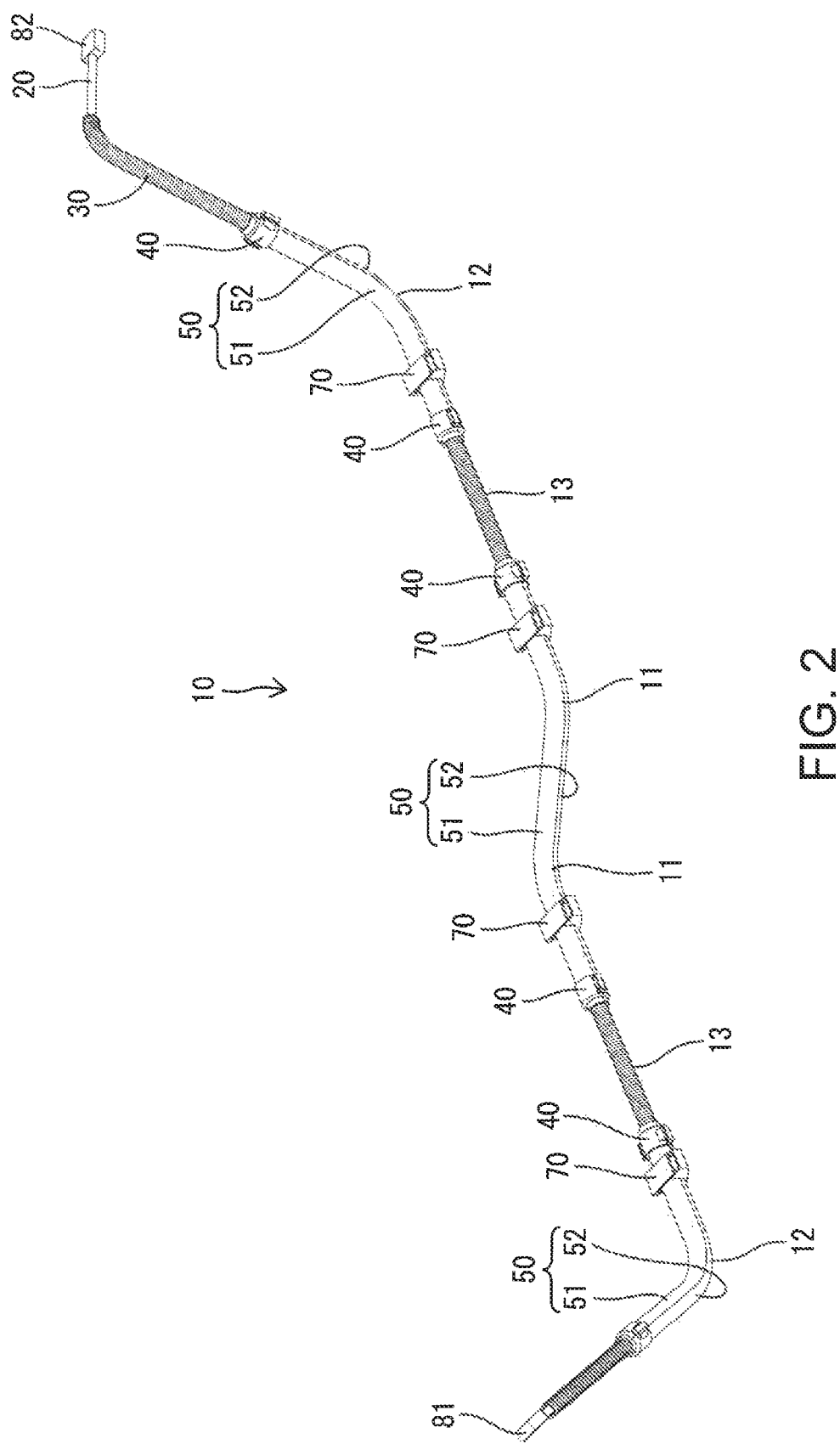
FIG. 2 is a perspective view of the wire harness.

As shown in FIG. 2, the wire harness 10 includes a plurality of bent sections 11 and 12 that are bent in the front-rear direction and the top-bottom direction, and has a three-dimensional shape overall. The bent sections 11 and 12 include: bent sections 11 that are each bent in the front-rear direction along the floor surface in a substantially central portion of the wire harness 10 in the front-rear direction; and bent sections 12 that respectively rise up from the front and rear end portions of the wire harness 10 toward the inside of the automobile. The wire harness 10 also includes a plurality of straight sections 13 that extend straight in the front-rear direction, each located between bent sections 11 and 12.

As shown in FIG. 2, the wire harness 10 includes: an electrical wire 20; a tubular member 30 through which the electrical wire 20 is passed; and path regulation members 50 that regulate the routing path of the electrical wire 20 at the bent sections 11 and 12.

The electrical wire 20 is flexible so as to be bendable, and is formed as a coated electrical wire in which the outer circumferential surface of a core wire portion 28 that is electrically conductive is covered by a coating portion 29 that is made of an insulative resin. In the first embodiment, only one electrical wire 20 is shown. However, a plurality of electrical wires 20 may be routed. The two ends of the electrical wire 20 are respectively connected to the connectors 81 and 82 corresponding thereto, via metal parts (not shown). The connectors 81 and 82 are typical connectors that each include a housing portion that has a rectangular block shape.

The tubular member 30 is flexible, and is configured to be bendable. In the first embodiment, the tubular member 30 is a corrugated tube that is made of a synthetic resin, has a bellowed tubular shape, and has a circumferential wall portion that is provided with recesses and protrusions that are alternatingly arranged. In this example, the tubular member 30 has a circular tube shape whose entire circumferential surface is closed. The electrical wire 20 is inserted into the tubular member 30, and front and rear portions of the electrical wire 20 are drawn out from the front and rear ends of the tubular member 30 and are connected to the connectors 81 and 82. The tubular member 30 extends along substantially the entire length of the wire harness 10 other than the front and rear ends thereof, so as to span the bent sections 11, 12, and the straight sections 13.

Each of the path regulation members 50 is made of metal, has a circular tube shape, and is slightly larger than the tubular member 30 in the radial direction. To regulate the routing path of the electrical wire 20, the path regulation members 50 are divided from each other, and are provided at a plurality of positions, including the positions of the bent sections 11 and 12. The path regulation members 50 are fitted onto the bent sections 11 and 12, and thus the bent shapes of the bent sections 11 and 12 are retained.

Figure 5:
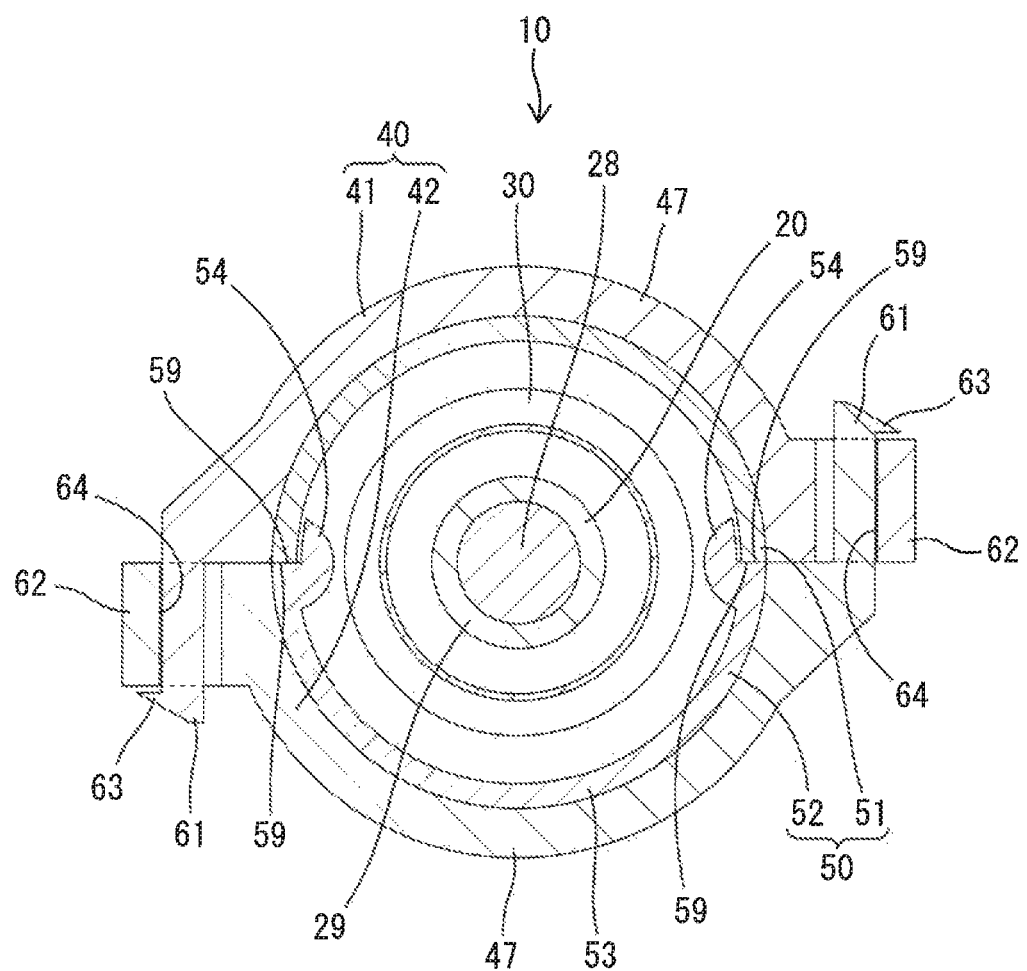
FIG. 5 is a cross-sectional view along a line A-A in FIG. 4.

As shown in FIGS. 1 and 2, each path regulation member 50 includes a pair of half-split pipes 51 and 52 that can be separated from and combined with each other in the radial direction. The half-split pipes 51 and 52 are each continuous in the front-rear direction with the cross-sectional shape unchanged, and one of these half-split pipes, namely the half-split pipe 51 (the upper half-split pipe in the figure), has a semicircular cross section overall. As shown in FIG. 5, the other half-split pipe, namely the half-split pipe 52 (the lower half-split pipe in the figure), includes: a main portion 53 that has the same semicircular cross section as the half-split pipe 51; and displacement restriction portions 54 that each have a semicircular cross section, and that protrude inward in a radial direction and thereafter protrude toward the one half-split pipe, namely the half-split pipe 51, at the respective two end portions of the main portion 53 in the circumferential direction. When the half-split pipes 51 and 52 are in a combined state, respective half-split surfaces 59 of the half-split pipes 51 and 52 at the two ends in the circumferential direction abut against each other, and thus the half-split pipes 51 and 52 become continuous in the circumferential direction and form a path regulation member 50 that has a circular tube shape. At this time, the displacement restriction portions 54 are provided so as to be able to abut against the inner circumferential surface (the inner surface) of the one of the half-split pipes, namely the half-split pipe 51, and thus the half-split pipes 51 and 52 are restricted from being displaced in the radial direction.

As shown in FIG. 2, the path regulation members 50 include bent portions that determine the bent shapes of the bent sections 11 and 12 of the wire harness 10 (in the following description, the bent portions are referred to as "the bent portions 11 and 12" using the same reference numerals as the bent sections 11 and 12). The bent portions 11 and 12 are each bent into a substantially V-like shape or a substantially S-like shape.

Specifically, the path regulation member 50 that is provided at a substantially central portion of the wire harness 10 in the front-rear direction includes two bent portions 11 that are bent in the left-right direction so as to extend along the floor surface. The path regulation members 50 that are provided at front and rear end portions of the wire harness 10 each include one bent portion 12 that is bent so as to rise up toward the inside of the automobile.

A core bar is placed inside the half-split pipes 51 and 52 in a combined state, for example, and the half-split pipes 51 and 52 are bent using a bending machine, manual force, or the like in such a state. Due to the core bar being inserted, the half-split pipes 51 and 52 are prevented from being squashed during a bending process. The above-described displacement restriction portions 54 also restrict the half-split pipes 51 and 52 from being displaced during a bending process. The direction in which the half-split pipes 51 and 52 are bent is the same as the direction (the top-bottom direction in the figure) in which the half-split pipes 51 and 52 are combined (or separated), or a direction (the left-right in the figure) that is orthogonal to the direction in which the half-split pipes 51 and 52 are combined, so that a distorting force is not applied to the half-split pipes 51 and 52 in a twisting direction. In other words, the direction in which the half-split pipes 51 and 52 are bent and the direction in which the half-split surfaces 59 of the half-split pipes 51 and 52 face each other are the same directions or directions that are orthogonal to each other (which may be directions that are substantially the same or directions that are substantially orthogonal to each other). Also, as shown in FIG. 1, circular holes 55 are drilled in the front and rear end portions of one of the half-split pipes, namely the half-split pipe 51. Such holes 55 are not drilled in the other half-split pipe, namely the half-split pipe 52.

Figure 3:
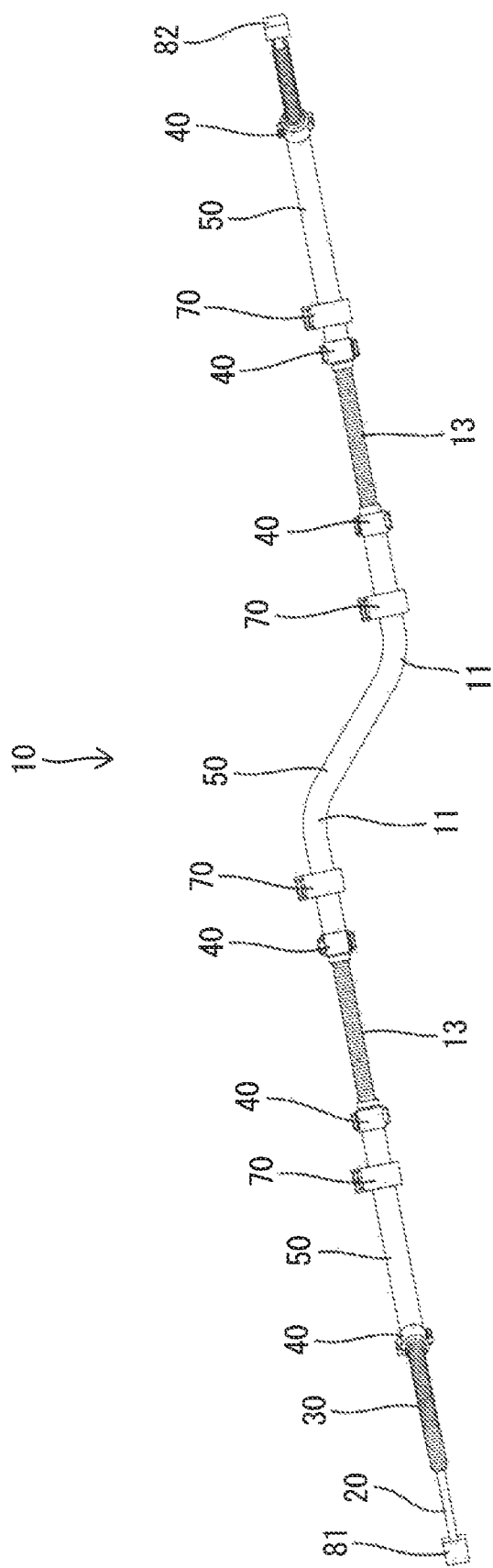
FIG. 3 is a plan view of the wire harness.

As shown in FIGS. 2 and 3, the wire harness 10 is provided with coupling members 40 that hold the half-split pipes 51 and 52 in a combined state. The coupling members 40 also have the function of coupling the path regulation members 50 and the tubular member 30.

Each coupling member 40 is made of a synthetic resin, and, as shown in FIGS. 6 to 9, includes a pair of half coupling members 41 and 42 that can be separated from and combined with each other in the radial direction. In the first embodiment, the half coupling members 41 and 42 can be separated from and combined with each other in the same direction as the half-split pipes 51 and 52 (in the top-bottom direction in the figure) (see FIG. 5).

Figure 7:
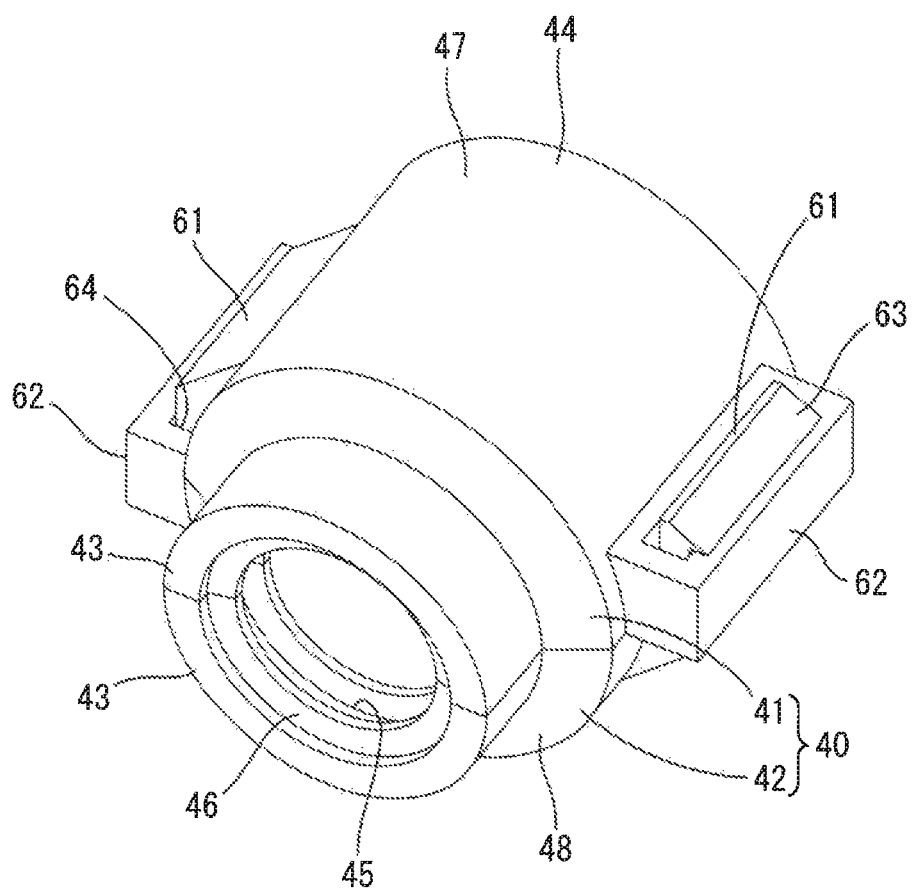
FIG. 7 is a perspective view of the coupling member seen from a rear side from above.
Figure 9:
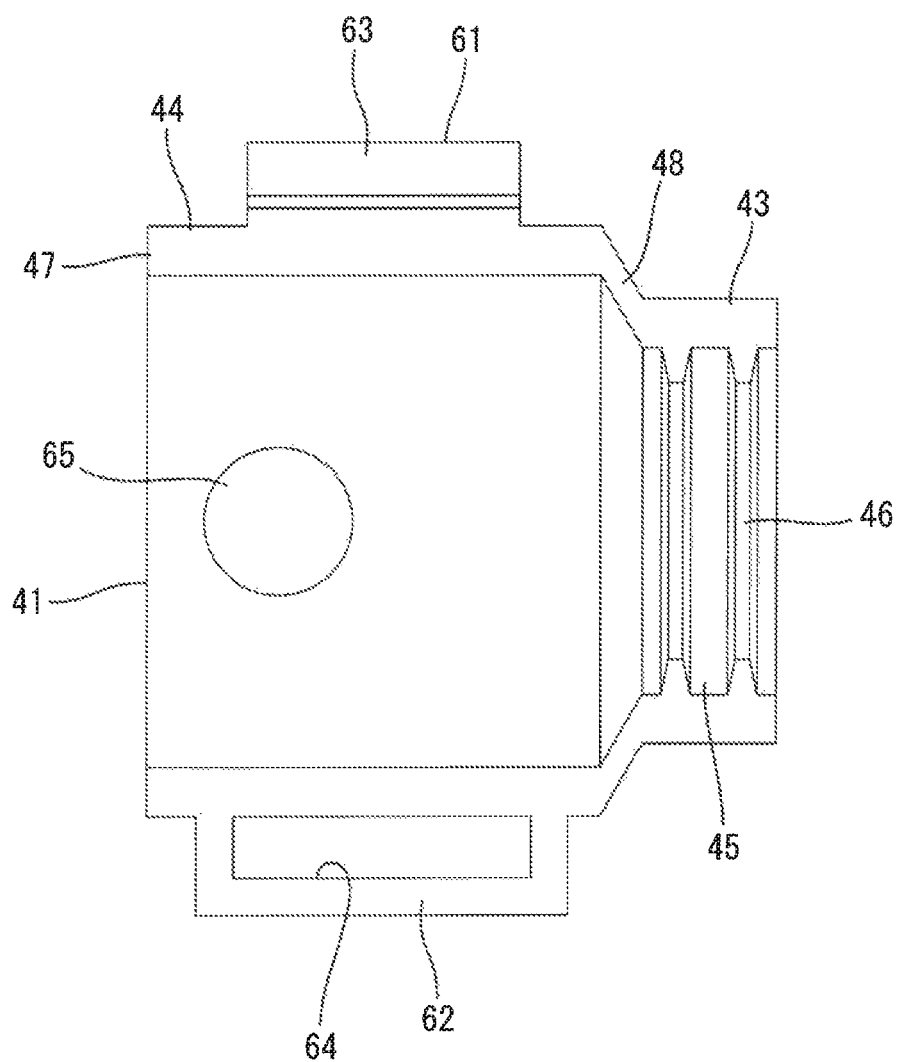
FIG. 9 is a plan view of a half coupling member.

Each of the half coupling members 41 and 42 includes a pipe engagement portion 44 and a tubular member engagement portion 43 that are continuous in the front-rear direction. The tubular member engagement portions 43 each have a semicircular cross section overall. When the half coupling members 41 and 42 are in a combined state, the tubular member engagement portions 43 are continuous in the circumferential direction and form a cylindrical shape. As shown in FIGS. 7 and 9, a recess/protrusion portion 45 that is fitted to the recesses and protrusions of the tubular member 30 is formed on the inner circumferential surface (the inner surface) of each of the tubular member engagement portions 43. The recess/protrusion portion 45 includes a plurality of protruding threads 46 that each extend in the circumferential direction and are arranged one after the other in the front-rear direction. The recess/protrusion portion 45 is not provided on the outer circumferential surfaces (the outer surfaces) of the tubular member engagement portions 43.

Figure 8:
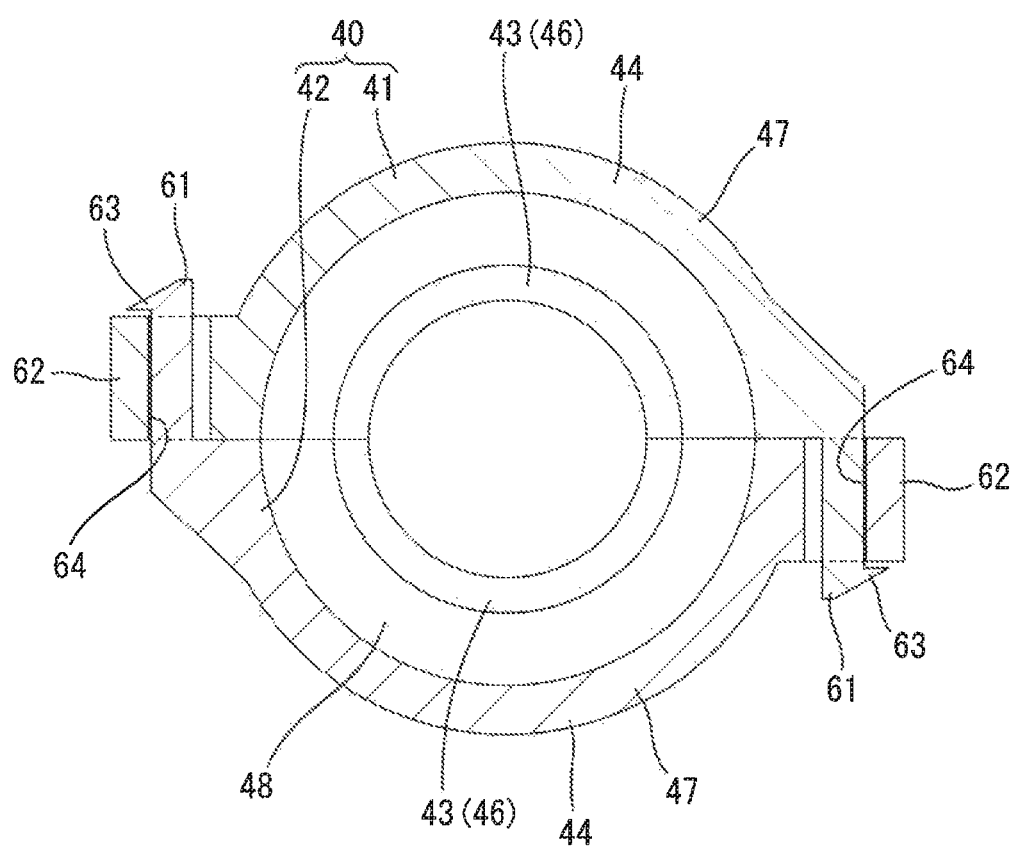
FIG. 8 is a cross-sectional view of the coupling member.

As shown in FIG. 8, each pipe engagement portion 44 includes a circumferential wall portion 47 that has a semicircular cross section. When the half coupling members 41 and 42 are in a combined state, the circumferential wall portions 47 are continuous in the circumferential direction and form a cylindrical shape. As shown in FIG. 7, the circumferential wall portions 47 are slightly larger than the tubular member engagement portions 43, and a step portion 48 that extends in the radial direction is formed between the circumferential wall portions 47 and the tubular member engagement portions 43.

As shown in FIGS. 8 and 9, the outer circumferential surface (the outer surface) of each circumferential wall portion 47 is provided with a lock portion 61 at one end in the circumferential direction, and is provided with a lock receiving portion 62 at the other end in the circumferential direction. Each lock portion 61 has the shape of a plate piece that protrudes outward from the outer circumferential surface of the circumferential wall portion 47 and thereafter protrudes toward the partner lock receiving portion 62, and has a lock claw 63 that protrudes outward toward the leading end so as to have a sharp shape. Each lock portion 61 can deform to warp inward and outward, pivoting about the base end thereof on the outer circumferential surface side of the circumferential wall portion 47. Each lock receiving portion 62 has a rectangular frame shape, protrudes from the outer circumferential surface of the circumferential wall portion 47, and is provided with a lock hole 64 that extends in the front-rear direction so as to have a slit shape and penetrates through the lock receiving portion 62 in the top-bottom direction.

As shown in FIG. 8, when the half coupling members 41 and 42 are combined together, the lock portion 61 of one of the half coupling members, namely the half coupling member 42, is inserted into the lock hole 64 of the other of the half coupling members, namely the half coupling member 41, and the lock claw 63 of the one of the half coupling members, namely the half coupling member 42, is elastically locked to an end surface (the upper surface of the lower surface) of the lock receiving portion 62 of the other of the half coupling members, namely the half coupling member 41. Also, the lock portion 61 of the other of the half coupling members, namely the half coupling member 41, is inserted into the lock hole 64 of the one of the half coupling members, namely the half coupling member 42, and the lock claw 63 of the one of the half coupling members, namely the half coupling member 41, is elastically locked to an end surface (the upper surface of the lower surface that is opposite to the aforementioned end surface) of the lock receiving portion 62 of the other of the half coupling members, namely the half coupling member 42. Thus, half coupling members 41 and 42 are held in a combined state.

Figure 6:
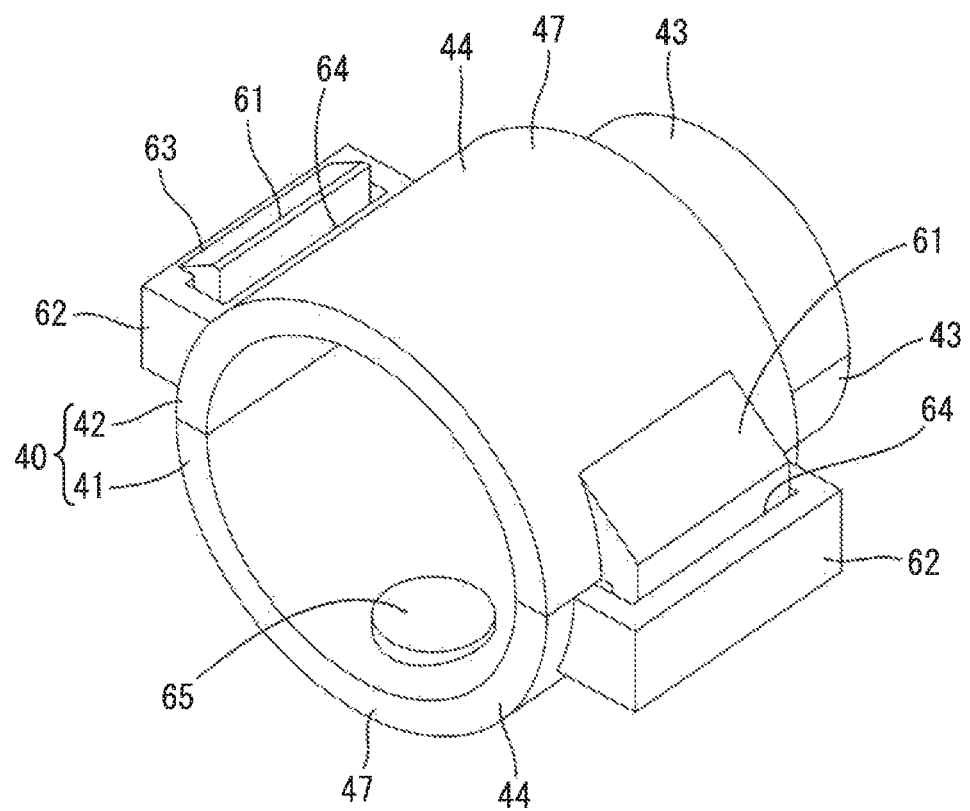
FIG. 6 is a perspective view of the coupling member seen from a front side from above.

As shown in FIG. 6, the one of the half coupling members 41 and 42, namely the half coupling member 41, is provided with a protruding portion 65 that has a flat and circular column shape on the inner circumferential surface (the inner surface) of the circumferential wall portion 47. As shown in FIG. 5, the half coupling members 41 and 42 are combined with each other such that the end portions of the path regulation members 50 are sandwiched between the respective circumferential wall portions 47 of the half coupling members 41 and 42, and thus the lock portions 61 are locked to the lock receiving portions 62 and the half coupling members 41 and 42 are held in a combined state. At the same time, the protruding portion 65 of one of the half coupling members, namely the half coupling member 41, is inserted and fitted into a hole 55 of one of the half-split pipes, namely the half-split pipe 51, in the radial direction. Thus, the half-split pipes 51 and 52 are held in a state of being restricted from separating from each other in the radial direction or in the front-rear direction. Note that each protruding portion 65 has a protruding dimension that is no greater than the thickness of the one of the half-split pipes, namely the half-split pipe 51, and thus the protruding portions 65 are configured to avoid interfering with the tubular member 30 provided in the half-split pipes 51 and 52.

As shown in FIGS. 2 and 3, the half-split pipes 51 and 52 are held in a combined state by clamps 70 in addition to the coupling members 40. Each clamp 70 is attached to an intermediate portion of a path regulation member 50 in the front-rear direction (other than front and rear end portions of the path regulation member 50 at which the coupling members 40 are provided). A plurality of clamps 70 are provided at appropriate intervals in the front-rear direction of the wire harness 10.

The clamps 70 are made of a synthetic resin, and, as shown in FIGS. 10 and 11, each clamp 70 includes a path regulation member receiving portion 71 and a lid portion 72. The path regulation member receiving portion 71 includes a fitting recessed portion 73 that penetrates through the path regulation member receiving portion 71 in the front-rear direction and has an upper opening as shown in the figure. The fitting recessed portion 73 has a major arc-shaped cross section, and is configured to receive a path regulation member 50 from above, and restrict the path regulation member 50 from coming out upward.

The path regulation member receiving portion 71 is also provided with a lid lock hole 74 and a bracket lock hole 75 that are arranged side by side and are adjacent to one side of the fitting recessed portion 73. As shown in FIG. 11, the upper opening of the lid lock hole 74 is partially closed by a lock piece 76 that has a roof shape. An elastic piece 77 that protrudes downward overall is provided inside the bracket lock hole 75. A bracket (not shown) of the automobile body is inserted into the bracket lock hole 75 from above. The bracket is elastically locked by the elastic piece 77 in the bracket lock hole 75, and thus the clamp 70 is fixed to the automobile body, and consequently the wire harness 10 is fixed to the automobile body.

The path regulation member receiving portion 71 is provided with a lock piece 78 that is located opposite to the lid lock hole 74 and the bracket lock hole 75. The lock piece 78 bulges outward from the upper end of the path regulation member receiving portion 71, and has a rib shape that extends in the front-rear direction.

As shown in FIG. 11, the lid portion 72 is provided with a protruding piece 79 that is located on the lower surface piece side of the flat main portion of the lid portion 72. The protruding piece 79 has a substantially V-shaped cross section, protrudes downward from the lower surface of the main portion, and is thereafter folded back in an obliquely upward direction. Also, the lid portion 72 is provided with a hook portion 69 that is located at an end portion that is opposite to the position at which the protruding piece 79 is located. The hook portion 69 has a substantial L-shaped cross section, protrudes downward from the main portion, and is thereafter bent inward.

The hook portion 69 of the lid portion 72 is hooked onto the lock piece 78 of the path regulation member receiving portion 71 with the path regulation members 50 being inserted into the fitting recessed portion 73 of the path regulation member receiving portion 71, and the lid portion 72 is tilted down so as to pivot about the hook position. As a result, the protruding piece 79 is inserted into the lid lock hole 74 from above, and the leading end portion of the protruding piece 79 is elastically locked to the lock piece 76. Thus, the upper opening of the path regulation member receiving portion 71 is closed by the lid portion 72, the lid portion 72 is fixed to the path regulation member receiving portion 71, and the half-split pipes 51 and 52 are held inside the clamp 70.

Next, the following describes procedures for assembling the wire harness 10 according to the first embodiment, and actions and effects thereof.

First, the electrical wire 20 is inserted into the tubular member 30. Next, the connectors 81 and 82 are connected to the front and rear end portions of the electrical wire 20 drawn out of the tubular member 30. As a result, a semifinished harness product 15 can be obtained (see FIG. 1). In the semifinished harness product 15, the outer circumferential surface of the electrical wire 20 is covered by the tubular member 30. However, the semifinished harness product 15 has not undergone path regulation using the path regulation members 50. Therefore, the semifinished harness product 15 can be bent at any position, and can be handled in a compact manner.

Subsequently, the path regulation members 50 are installed such that the bent portions 11 and 12 positionally correspond to the bent sections 11 and 12 of the wire harness 10. Here, the path regulation members 50 are manufactured using a pair of half-split pipe base materials (pipe base materials) that are elongated in the front-rear direction and can be separated from and combined with each other. Each half-split pipe base material is formed using the above-described core bar or the like, is bent so that the bent portions 11 and 12 are formed, and is furthermore divided into a plurality of sections each having a predetermined size. Thus, the half-split pipes 51 and 52 that constitute the path regulation members 50 are provided so as to correspond to the bent sections 11 and 12 of the wire harness 10.

The half-split pipes 51 and 52 are combined together in the radial direction (e.g. in the top-bottom direction in FIG. 1), with the tubular member 30 being sandwiched therebetween. At this time, the electrical wire 20 and the tubular member 30 are housed in the half-split pipes 51 and 52 while being bent along the bent shapes of the half-split pipes 51 and 52.

Figure 4:
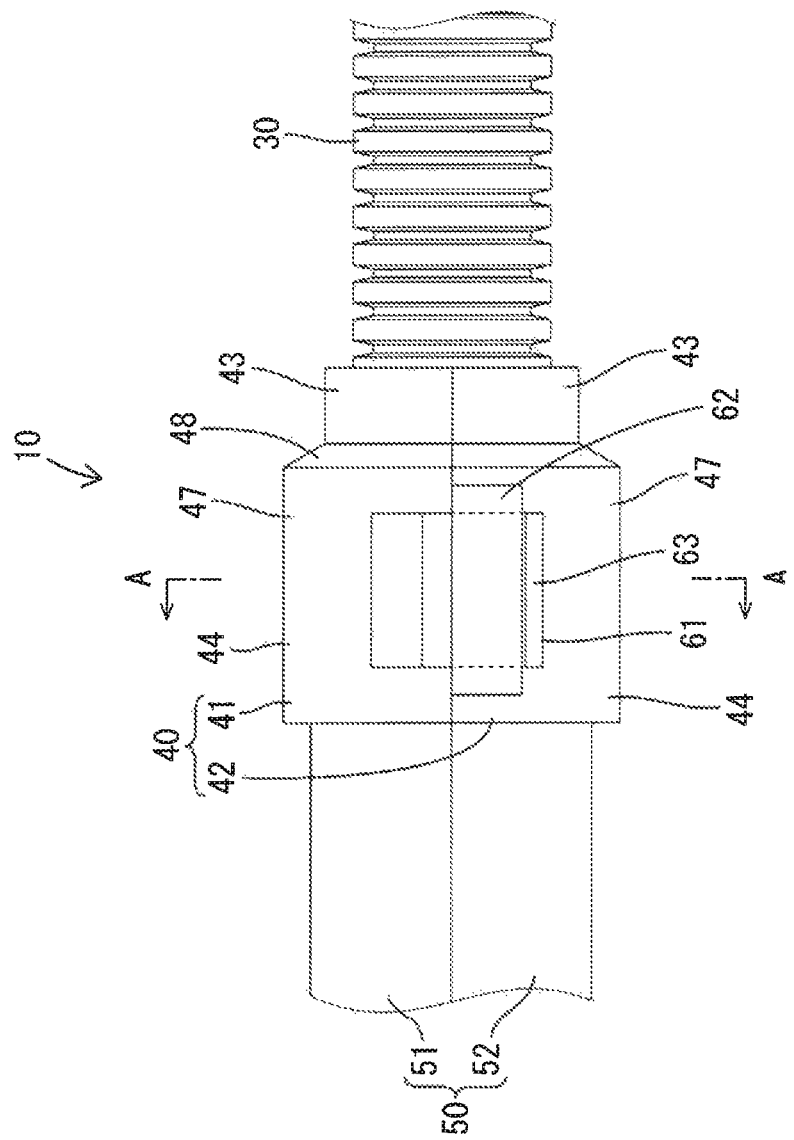
FIG. 4 is an enlarged side view showing a structure for coupling a tubular member and a path regulation member to each other.

Subsequently, the half coupling members 41 and 42 are combined together in the radial direction, with the section spanning between the front and rear end portions of the half-split pipes 51 and 52 and the tubular member 30 being sandwiched therebetween. As shown in FIG. 4, the half coupling members 41 and 42 are held to each other due to the lock portions 61 and the lock receiving portions 62 being locked to each other, and are positioned by the path regulation members 50 due to the protruding portions 65 fitted and inserted into the holes 55. Also, the recess/protrusion portions 45 of the tubular member engagement portions 43 are fitted to the recesses and protrusions of the outer circumferential surface (the outer surface) of the tubular member 30 in the radial direction, and the protruding threads 46 of the recess/protrusion portions 45 are positioned and inserted into the groove portions of the tubular member 30. Thus, the half coupling members 41 and 42 are fixed to the tubular member 30, and also the tubular member 30 is positioned and fixed by the path regulation members 50, using the coupling members 40. Also, the clamps 70 are attached to predetermined positions of the wire harness 10 (positions corresponding to the positions of the automobile body to which the wire harness 10 is attached) at an appropriate point in time.

In the wire harness 10 thus assembled, the tubular member 30 is exposed at intermediate sections between the straight sections 13, and each path regulation member 50 is exposed at a section that spans from the bent section 11 or 12 to an end of a straight section 13. As shown in FIG. 5, in the cross section of the bent portions 11 and 12 along a direction that is orthogonal to the lengthwise direction of the wire harness 10, the tubular member 30 is located inside the path regulation member 50, and the electrical wire 20 is located inside the tubular member 30. The path regulation members 50 are fitted onto the bent sections 11 and 12 so that the bent sections 11 and 12 are each held in a predetermined bent shape, and thus the routing path of the electrical wire 20 is regulated.

As described above, according to the first embodiment, the bent portions 11 and 12 of the path regulation members 50 are subjected to a bending process so as to be located at positions corresponding to the bent sections 11 and 12 of the wire harness 10, and thus the routing path of the electrical wire 20 can be easily regulated. Therefore, even if the shapes and positions of the bent sections 11 and 12 are changed, it is possible to easily and flexibly adapt to such a design change.

Also, the path regulation members 50 are metal tubes, which have a simpler structure compared to a conventional protector that is made of resin. Therefore, it is possible to avoid forming a complex mold structure, and it is possible to more flexibly adapt to a design change. Also, it is easier to apply a bending process to the path regulation members 50, and it is possible to achieve rigidity that is sufficient to retain the shapes of the bent portions 11 and 12.

Also, a plurality of path regulation members 50 are provided at intervals in the front-rear direction of the wire harness 10. Therefore, it is possible to omit path regulation members 50 from sections where the need for path regulation is low (sections that mainly include the straight sections 13, which are referred to as non-path regulation sections), and it is possible to easily protect the non-path regulation sections using the flexible tubular member 30. Furthermore, since path regulation members 50 are not provided on the non-path regulation sections, it is possible to suppress an increase in the weight of the wire harness 10. Furthermore, it is easy to form a plurality of path regulation members 50 by cutting an elongated pipe base material (half-split pipe base material) into pieces that have a predetermined length.

Furthermore, since the half-split pipes 51 and 52 are combined together so as to sandwich the electrical wire 20 therebetween, the path regulation members 50 have a cylindrical shape. Therefore, it is unnecessary to insert the electrical wire 20 into each path regulation member 50 from one of the front and rear ends thereof to the other, and thus workability is excellent. In addition, it is easy to attach the path regulation members 50 after inserting the electrical wire 20 into the tubular member 30 and connecting the connectors 81 and 82 to an end portion of the electrical wire 20. Thus, workability is excellent.

Furthermore, the direction in which the half-split pipes 51 and 52 and the half-split surfaces 59 face each other and the direction in which the bent portions 11 and 12 are bent are the same or orthogonal to each other. Therefore, when performing a bending process on the bent portions 11 and 12, it is possible to prevent a distorting force from being applied to the half-split surfaces 59 of the half-split pipes 51 and 52 in a twisting direction. Thus, it is possible to improve processing accuracy. In this case, the protruding portion 65 of the one of the half coupling members, namely the half coupling member 41, is fitted into the hole 55 of the one of the half-split pipes, namely the half-split pipe 51. Therefore, the coupling members 40 and the path regulation members 50 are restricted from being displaced in the radial direction or the front-rear direction.

Furthermore, the tubular member engagement portions 43 of the coupling members 40 are fitted to the recesses and protrusions of the tubular member 30 in the radial direction. Therefore, the coupling members 40 can have both the function of holding the half-split pipes 51 and 52 and the function of restricting the tubular member 30 and the path regulation members 50 from being displaced relative to each other. Thus, it is possible to simplify the configuration compared to when these functions are provided by separate members. In this case, the tubular member 30 is a corrugated tube, and therefore, it is possible to use the recesses and protrusions of the corrugated tube without change, and it is unnecessary to make a design change to the tubular member 30.

Furthermore, in a cross section of the bent portions 11 and 12 along a direction that is orthogonal to the lengthwise direction of the wire harness 10, the tubular member 30 is located inside the path regulation members 50, and the electrical wire 20 is located inside the tubular member 30. Therefore, it is possible to more reliably protect the electrical wire in the bent portions 11 and 12. Furthermore, it is possible to insert the electrical wire 20 into the tubular member 30 by performing only one operation.

Second Embodiment

Figure 13:
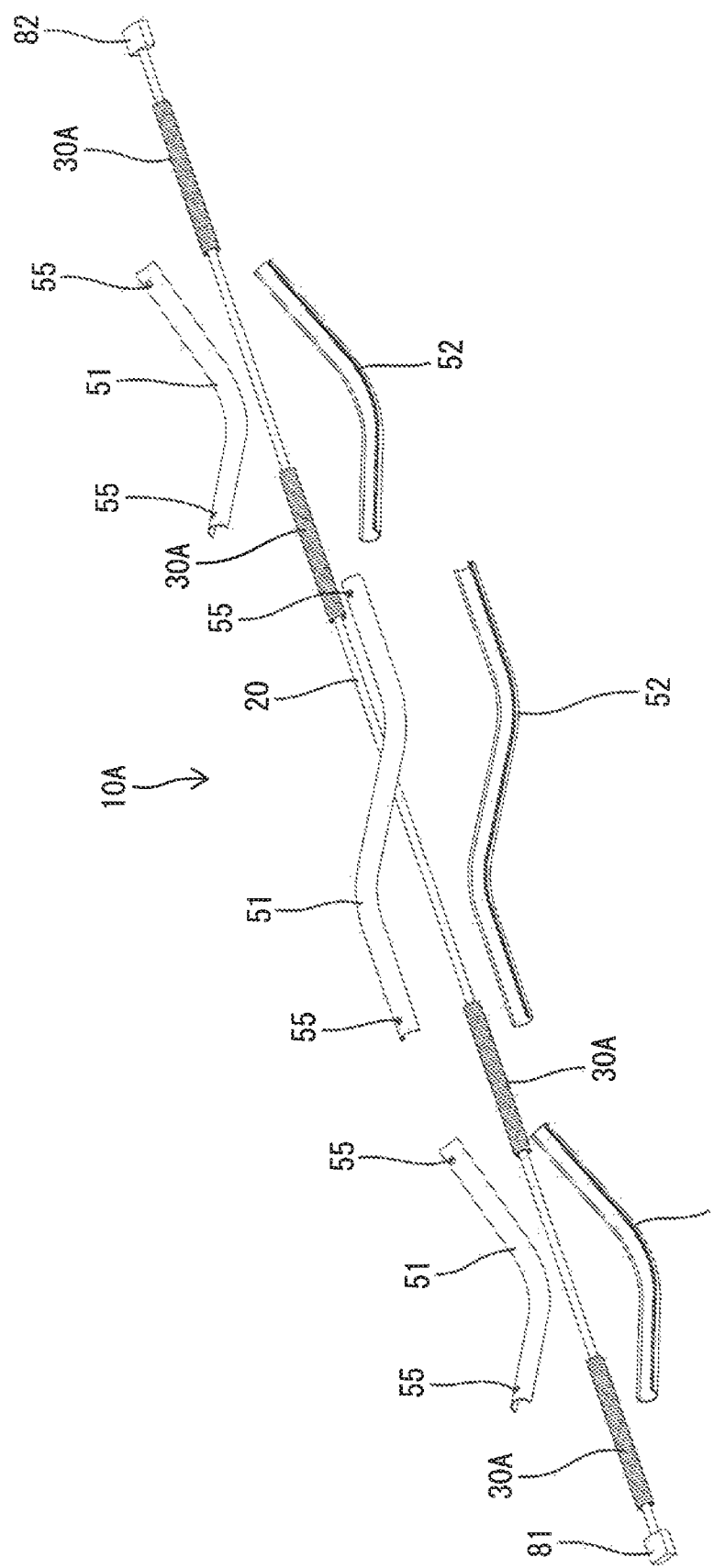
FIG. 13 is a partially-exploded perspective view of a wire harness according to a second embodiment.
Figure 14:
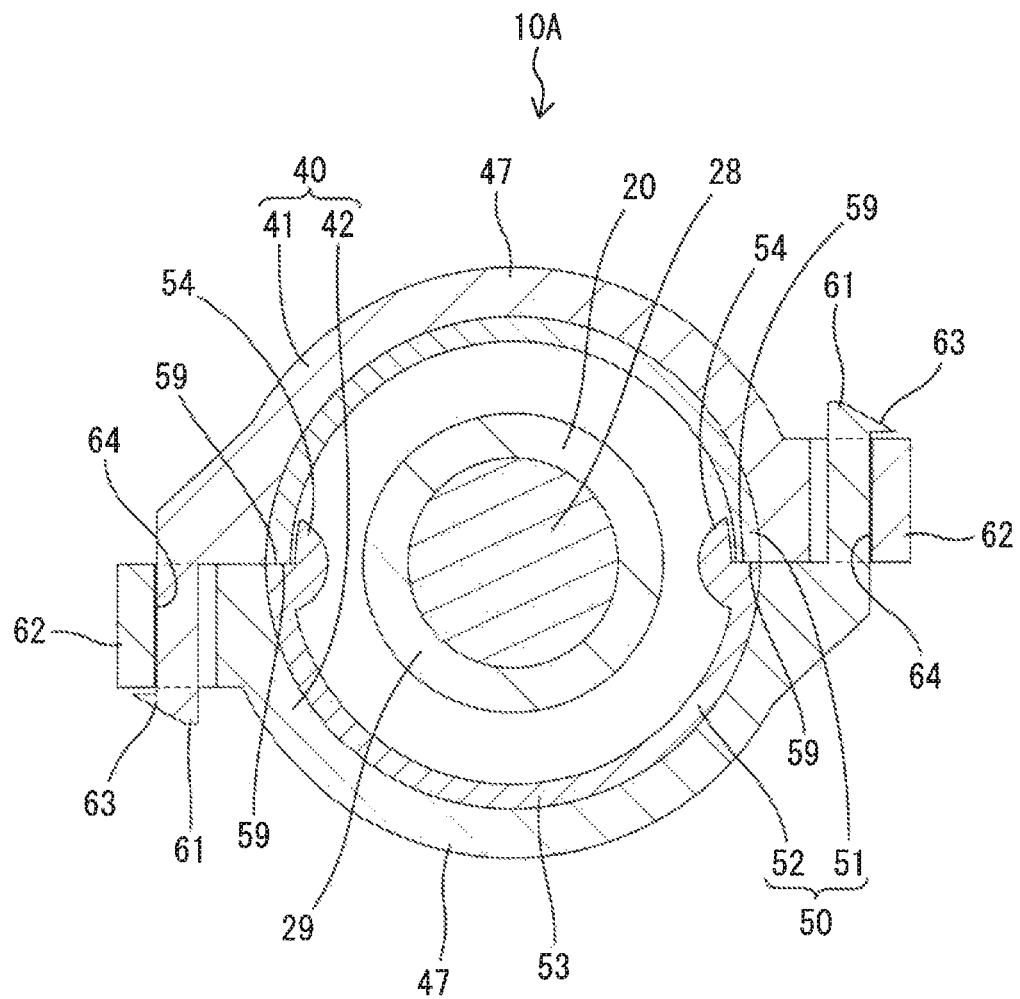
FIG. 14 is a diagram corresponding to FIG. 5, of the wire harness according to the second embodiment.

FIGS. 13 and 14 show a second embodiment. A wire harness 10A according to the second embodiment is different from the first embodiment in the shape (length), number, and positions of tubular members 30A. The second embodiment is otherwise the same as the first embodiment, and the same or corresponding portions are assigned the same reference numerals, and duplicate descriptions are omitted.

The tubular members 30A are corrugated tubes, but are separately provided at a plurality of positions corresponding to the straight sections 13 of the wire harness 10A. The path regulation members 50 are, as in the first embodiment, provided at a plurality of positions such that the positions of the bent portions 11 and 12 correspond to the positions of the bent sections 11 and 12 of the wire harness 10A. Therefore, the tubular members 30A and the path regulation members 50 are arranged one after the other in the front-rear direction of the wire harness 10A. The second embodiment is the same as the first embodiment in that the tubular members 30A and the path regulation members 50 are coupled to each other using the coupling members 40. As shown in FIG. 14, in a cross section of the bent portions 11 and 12 along a direction that is orthogonal to the lengthwise direction of the wire harness 10, the electrical wire 20 is located at a substantially central portion, and the outer circumferential surface of the electrical wire 20 is enclosed by the path regulation member 50. Thus, unlike in the first embodiment, the tubular members 30A are not interposed between the electrical wire 20 and the path regulation member 50. Therefore, the tubular members 30A are not present at positions corresponding to the bent portions 11 and 12, and it is possible to reduce the diameter of the bent portions 11 and 12, and reduce the material cost of the tubular members 30A.

Third Embodiment

Figure 15:
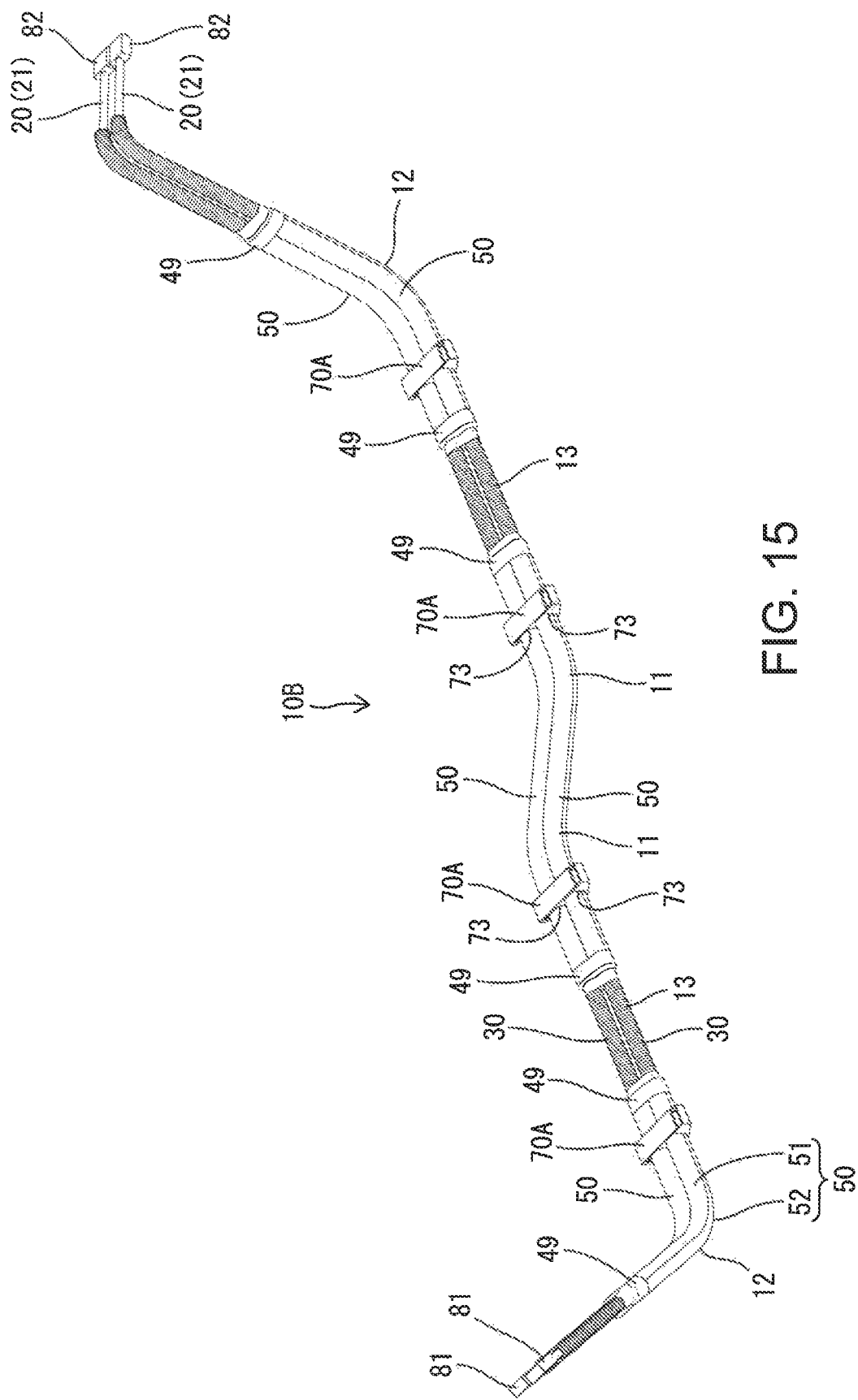
FIG. 15 is a perspective view of a wire harness according to a third embodiment.

FIG. 15 shows a third embodiment.

In a wire harness 10B according to the third embodiment, a plurality of (two in the figure) electrical wires 20, which serve as conductive paths 21, are arranged side by side in the left-right direction, and a path regulation member 50 and a tubular member 30 are fitted onto each of the conductive paths 21. As in the first embodiment, the path regulation members 50 are separately located such that the bent portions 11 and 12 correspond to the bent sections 11 and 12 of the wire harness 10B, and the tubular member 30 is located so as to span the bent sections 11, 12, and the straight sections 13.

Path regulation members 50 that are adjacent to each other in the left-right direction (side by side) are held and fixed by clamps 70A all at once. Each clamp 70A has a plurality of (two in the figure) fitting recessed portions 73 that are arranged in the left-right direction, to receive the path regulation members 50. Also, path regulation members 50 that are adjacent to each other in the front-rear direction and the tubular members 30 are held to each other using a piece of tape 49 that is wound around the path regulation members 50 and the tubular members 30. Thus, the present disclosure is applicable to a wire harness 10 for multiple circuits.

Other Embodiments

The following briefly describes other embodiments.

(1) The tubular member may be a rubber grommet or a shrink tube. Also, the tubular member may be a twisted tube.

(2) The tubular member may have a C-shaped cross section, U-shaped cross section, or the like, may include an open portion, or may be configured to be openable using a slit that is formed in the lengthwise direction.

(3) The shape of each path regulation member is not particularly limited, as long as it is configured to regulate the routing path of the electrical wire. For example, each path regulation member may have a C-shaped cross section or a U-shaped cross section, may include an open portion, and furthermore, may be made of a plate member such as a flat plate, and may be configured to hold the electrical wire that is supported on the plate surface, using a piece of tape or the like.

(4) Each path regulation member may be formed as an integrated inseparable circular tube member instead of as a pair of separable half-split pipes. If this is the case, the inner diameter of the path regulation member is preferably larger than the external dimensions of a connector so that the connector can be inserted into the path regulation member.

(5) Each path regulation member may be a complex tube formed by stacking a resin layer and a metal layer in the radial direction.

(6) One path regulation member may be processed to be bent at a plurality of positions in the lengthwise direction, and for example, may be three-dimensionally bent in the front-rear direction and top-bottom direction.

(7) Each pair of half-split pipes may be integrally coupled to each other using a hinge so as to be openable and closable.

(8) Each pair of half-split pipes may be coupled to each other by means of welding such as ultrasonic welding. Also, as in the third embodiment, each pair of half-split pipes in the first and second embodiments may be held in a combined state using a piece of tape, which serves as a coupling member.

(9) Each pair of half coupling members may be integrally coupled to each other using a hinge so as to be openable and closable.

(10) Holes may be provided in the other half-split pipe instead of in the one half-split pipe. Alternatively, holes may be provided in both of the half-split pipes.

(11) A recess/protrusion portion may be provided on only one of the half coupling members. Also, a recess/protrusion portion may be provided on a portion of the inner circumferential surface of at least one of the half coupling members.

(12) Each coupling member may be provided with a structure (a clamp) that can be attached to an automobile body.

(13) Only one bent section may be provided at a midpoint in the path of the wire harness.

(14) In the second embodiment, an end portion of the tubular member and end portions of the path regulation members (at least portions other than the bent portions) may overlap in the radial direction.

(15) The electrical wire is not limited to typical coated electrical wire, and may be a shielded electrical wire.

LIST OF REFERENCE NUMERALS 10, 10A, 10B: Wire Harness
11, 12: Bent Portion (Bent Section)
13: Straight Section
20: Electrical Wire
30, 30A: Tubular Member
40: Coupling Member
41, 42: Half Coupling Member
43: Tubular Member Engagement Portion
45: Recess/Protrusion portion
50: Path Regulation Member
51, 52: Half-split Pipe
70, 70A: Clamp

What is claimed is:

1. A wire harness comprising:
a tubular member that is flexible and into which a plurality of electrical wires are inserted; and
a path regulation member extending along a length of the plurality of electrical wires and configured to regulate a routing path of the plurality of electrical wires through the path regulation member,
wherein the path regulation member comprises a fixed bent portion that retains a shape,
wherein the tubular member extends through the path regulation member, and
wherein the path regulation member is provided in a plurality at intervals in a lengthwise direction of the wire harness.

2. The wire harness according to claim 1,
wherein the path regulation member is a metal tube or a complex tube that is made of metal and resin.

3. The wire harness according to claim 2,
wherein the path regulation member comprises a pair of half-split pipes that are combined together with the plurality of electrical wires being sandwiched therebetween.

4. The wire harness according to claim 3,
wherein a direction in which half-split surfaces of the pair of half-split pipes face each other and a direction in which the bent portion is bent are the same or orthogonal to each other.

5. The wire harness according to claim 4, further comprising:
a coupling member that holds the pair of half-split pipes in a combined state,
wherein the coupling member is provided with a pipe engagement portion that restricts the pair of half-split pipes from moving in an axial direction.

6. The wire harness according to claim 5,
wherein the tubular member is a corrugated tube, and the coupling member is provided with a tubular member engagement portion that is fitted to a recess and a protrusion of the corrugated tube in a radial direction.

7. A wire harness comprising:
a tubular member that is flexible and into which a plurality of electrical wires are inserted; and
a path regulation member extending along a length of the plurality of electrical wires and configured to regulate a routing path of the plurality of electrical wires through the path regulation member,
wherein the path regulation member comprises a fixed bent portion that retains a shape,
wherein the tubular member extends through the path regulation member, and
wherein the path regulation member comprises a pair of half-split pipes that are combined together with the plurality of electrical wires being sandwiched therebetween.

8. The wire harness according to claim 7,
wherein the path regulation member is a metal tube or a complex tube that is made of metal and resin.

9. The wire harness according to claim 7,
wherein the path regulation member is provided in a plurality at intervals in a lengthwise direction of the wire harness.

10. The wire harness according to claim 7,
wherein a direction in which half-split surfaces of the pair of half-split pipes face each other and a direction in which the bent portion is bent are the same or orthogonal to each other.

11. The wire harness according to claim 10, further comprising:
a coupling member that holds the pair of half-split pipes in a combined state,
wherein the coupling member is provided with a pipe engagement portion that restricts the pair of half-split pipes from moving in an axial direction.

12. The wire harness according to claim 11,
wherein the tubular member is a corrugated tube, and the coupling member is provided with a tubular member engagement portion that is fitted to a recess and a protrusion of the corrugated tube in a radial direction.

* * * * *